United States Patent
Jansma et al.

(10) Patent No.: US 9,269,559 B1
(45) Date of Patent: Feb. 23, 2016

(54) COMPOSITIONS AND METHODS FOR MODIFYING LUMEN MAINTENANCE CHARACTERISTICS OF PHOSPHOR-CONTAINING COATINGS

(71) Applicant: GENERAL ELECTRIC COMPANY, Schenectady, NY (US)

(72) Inventors: Jon Bennett Jansma, Pepper Pike, OH (US); William Winder Beers, Chesterland, OH (US); William Erwin Cohen, Solon, OH (US); Fangming Du, Northfield, OH (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 0 days.

(21) Appl. No.: 14/487,788

(22) Filed: Sep. 16, 2014

(51) Int. Cl.
| | |
|---|---|
| *H01J 9/00* | (2006.01) |
| *H05B 33/10* | (2006.01) |
| *H01J 61/44* | (2006.01) |
| *C09K 11/02* | (2006.01) |
| *C09K 11/67* | (2006.01) |
| *C09K 11/74* | (2006.01) |
| *C09K 11/77* | (2006.01) |
| *C09K 11/71* | (2006.01) |
| *C09D 5/22* | (2006.01) |
| *C09K 11/73* | (2006.01) |

(52) U.S. Cl.
CPC . *H01J 61/44* (2013.01); *C09D 5/22* (2013.01); *C09K 11/025* (2013.01); *C09K 11/676* (2013.01); *C09K 11/71* (2013.01); *C09K 11/73* (2013.01); *C09K 11/7478* (2013.01); *C09K 11/778* (2013.01); *C09K 11/7734* (2013.01)

(58) Field of Classification Search
CPC .......... H01J 61/44; H01J 61/42; H01J 61/35; C09K 11/73; C09K 11/778; C09K 11/7734; C09K 11/676; C09K 11/71; C09K 11/025; C09K 11/7478; C09K 11/02; C09D 5/22
USPC ..................... 313/484–487, 489, 635; 445/26
See application file for complete search history.

(56) References Cited

U.S. PATENT DOCUMENTS

| | | | |
|---|---|---|---|
| 5,417,886 A | 5/1995 | Tateiwa | |
| 5,523,018 A | 6/1996 | Okada | |
| 5,604,396 A * | 2/1997 | Watanabe et al. | 313/485 |
| 6,774,557 B2 | 8/2004 | Jansma | |
| 2005/0062395 A1* | 3/2005 | Takahashi et al. | 313/467 |
| 2011/0311823 A1* | 12/2011 | Porob et al. | 428/402.24 |
| 2013/0134861 A1 | 5/2013 | Jansma | |
| 2013/0193835 A1* | 8/2013 | Cohen et al. | 313/487 |

* cited by examiner

*Primary Examiner* — Anne Hines
*Assistant Examiner* — Jose M Diaz
(74) *Attorney, Agent, or Firm* — GE Global Patent Operation; Peter T. DiMauro

(57) ABSTRACT

Phosphor-containing coating compositions and methods capable of changing the lumen maintenance characteristics of phosphor-containing coatings and fluorescent lamps that utilize such coatings. Lumen maintenance of a fluorescent lamp can be modified by forming a phosphor-containing coating to contain at least a first phosphor that depreciates during operation of the fluorescent lamp, and forming the phosphor-containing coating to further contain an additive composition in a sufficient amount and sufficiently uniformly distributed in the phosphor-containing coating to inhibit depreciation of the first phosphor during operation of the fluorescent lamp.

5 Claims, 1 Drawing Sheet

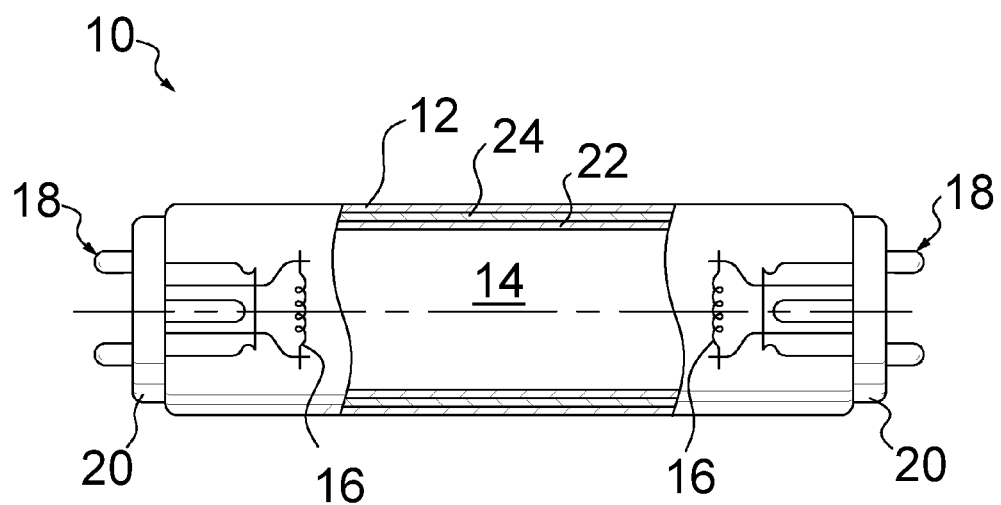

COMPOSITIONS AND METHODS FOR MODIFYING LUMEN MAINTENANCE CHARACTERISTICS OF PHOSPHOR-CONTAINING COATINGS

BACKGROUND OF THE INVENTION

The present invention generally relates to lighting systems and related technologies. More particularly, this invention relates to fluorescent lamps and coating systems utilized by fluorescent lamps to generate visible light.

Fluorescent lamps have been in use and commercialization since the 1930s. More recently, both consumers and producers have voiced increased concerns for energy efficiency and environmental impact of products, spanning all industries, including the lighting industry. As such, fluorescent lamps have seen an increase in usage due to their increased energy efficiency as compared to conventional incandescent lights. Fluorescent lamps see a great deal of competition from light-emitting diode (LED) lights due to a potential for greater efficiency and luminosity of LEDs. Significant effort and research have been made in the interest of improving fluorescent light lumen output without increasing power requirements or significantly increasing material costs.

A nonlimiting example of a fluorescent lamp 10 is schematically represented in FIG. 1. The lamp 10 is represented as having a sealed glass tube comprising of a glass envelope or shell 12 enclosing an interior chamber 14. The chamber 14 is preferably at very low pressure, for example, around 0.3% atmospheric pressure, and contains a gas mixture having at least one constituent that can be ionized to generate radiation that includes ultraviolet (UV) wavelengths. According to the current state of the art, such a gas mixture includes one or more inert gases (for example, argon) or a mixture of one or more inert gases and other gases at a low pressure, along with a small quantity of mercury vapor. Electrodes 16 inside the chamber 14 are electrically connected to electrical contact pins 18 that extend from oppositely-disposed bases 20 of the lamp 10. When the contact pins 18 are connected to a power source, the applied voltage causes current to flow through the electrodes 16 and electrons to migrate from one electrode 16 to the other electrode 16 at the other end of the chamber 14. In the process, this energy converts a small amount of the liquid mercury from the liquid state to a charged (ionized) gaseous (vapor) state. The electrons and charged gas molecules move through the chamber 14, occasionally colliding with and exciting the gaseous mercury molecules, raising the energy level of the electrons in the mercury atoms. In order to return to their original energy level, the electrons release photons.

Due to the arrangement of electrons in mercury atoms, most of the photons released by these electrons are in the ultraviolet (UV) wavelengths. This is not visible light, and as such for the lamp 10 to emit visible light these photons must be converted to a visible light wavelength. Such a conversion can be performed by a coating 22 disposed at the interior surface of the glass shell 12. The coating 22 comprises phosphor powders and, as represented in FIG. 1, is separated from the glass shell 12 by a UV-reflecting barrier layer 24 of, for example, alumina ($Al_2O_3$). As known in the art, the coating 22 can be produced by applying to the shell 12 a suspension containing particles of the desired phosphor(s) combined with one or more surfactants, dispersants, thickening agents, etc., and then performing a lehring operation that involves heating the applied suspension to remove suspension components, leaving the phosphor particles (and potentially other particle materials) to form the coating 22 on the shell 12. The UV wavelengths emitted by the ionized mercury vapor are absorbed by the phosphor composition within the coating 22, resulting in excitation of the phosphor composition to produce visible light that is emitted through the glass shell 12. More particularly, when electrons of the phosphor atoms are struck by photons, the electrons become excited to a higher energy level and emit a photon to return to their original energy level. The emitted photon has less energy than the impinging photon and is in the visible light spectrum to provide the lighting function of the lamp 10. The color and luminosity of the lamp 10 are largely the result of the phosphor or phosphors used in the coating 22.

The mercury in low pressure fluorescent lamps predominantly emits UV radiation having a wavelength of 254 nm, and to a lesser extent a wavelength of 185 nm. As used herein, "predominantly" and "predominant" mean that something contains more of one constituent (the "predominant constituent"), e.g., by weight, volume, molar, or other quantitative percent, than any other individual constituent. As these terms are used herein in relation to radiation, "predominantly" and "predominant" signify a wavelength that is more prevalent in a band of radiation than any other individual wavelength. Some estimates are that roughly 90% of UV radiation generated by low pressure fluorescent lamps is at the predominant 254 nm wavelength, with the balance (roughly 10%) being the 185 nm wavelength. Both of these wavelengths fall within a wavelength range known as ultraviolet subtype C. Phosphors used in low pressure mercury lamps are typically excited by different ranges of wavelengths that encompass the primary wavelength (254 nm) to absorb as much UV radiation as possible. The efficiency and effectiveness of fluorescent lamps and their coating systems can differ based on what phosphors are used and what wavelengths of light are absorbed.

The apparent, or perceived, color of a light source can be described in terms of color temperature, which is the temperature of a black body that emits radiation of about the same chromaticity as the radiation considered. A light source having a color temperature of 3000K has a larger red component than a light source having a color temperature of 4100K. As additional examples, a fluorescent lamp having a perceived "warm white" color may have a correlated color temperature (CCT) of approximately 3000K, whereas a fluorescent lamp having a perceived "cool white" color may have a CCT of approximately 4000K. Another measure of fluorescent lamp performance is the color rendering index (CRI). The CRI of a light source does not indicate the apparent color of the light source, but instead is a quantitative measure of the ability of a light source to reproduce the colors of objects faithfully in comparison with an ideal or natural light source. CRIs can only be accurately compared among two light sources having the same CCT. The highest possible numeric CRI value is 100. Incandescent lamps, which are essentially blackbodies, have CRIs of 100. Typical LEDs have CRIs of 80 or more, with CRIs of up to 98 being claimed, whereas fluorescent lamps typically have CRIs in a range of about 50 to about 90. In this regard, a high CRI for fluorescent lamps can be considered to be about 80 and higher, particularly at least 87.

Another metric by which fluorescent lamp performance can be gauged is light output or lumen maintenance, which characterizes the ability of a lamp to provide roughly the same amount of luminosity over its life span. All lamps exhibit some reduction in luminosity over time, though some more so than others, depending on the phosphors they utilize. Zinc silicate phosphors such as manganese-doped zinc silicate green phosphor (ZSM) are particular but nonlimiting examples of phosphors that can exhibit poor lumen maintenance characteristics, with other notable examples including strontium-based phosphors such as tin-doped strontium phosphate red (SR) and tin-doped strontium phosphate blue phosphor (SB), and typically to a lesser extent halophosphors. ZSM phosphor has been used separately in lamps that emit green light and in combinations with other phosphors to emit white light. As nonlimiting examples of the latter, phosphor blends containing ZSM, SR and SB have been used or considered for use in high CRI lamps formulated for color temperatures of about 4100K, and phosphor blends containing ZSM, cerium magnesium borate (CBM), europium-doped strontium aluminate (SAE), and halophosphors have been used or considered for use in high CRI lamps formulated for color temperatures ranging from 2700K to 3500K. Though these phosphor blends have certain desirable qualities, for example, excellent color rendering, initial color properties, and/or initial light levels, they suffer from poor lumen maintenance characteristics, attributable at least in part to their ZSM content.

Poor lumen maintenance is characterized by a rapid depreciation of a phosphor during normal operation of a lamp, and can be particularly evident in highly loaded lamps such as T5, T5HO, CFL, and BIAX types. The poor lumen maintenance characteristics of ZSM, SR and SB may be attributed in part to their propensity for mercury consumption (binding), and the poor lumen maintenance characteristics of ZSM can be further attributed at least in part to sensitivity to 185 nm radiation emitted by low pressure mercury lamps. Various attempts have been made to improve lumen maintenance in lamps that contain ZSM and/or other phosphors that exhibit poor lumen maintenance characteristics. As examples, chemical vapor deposition (CVD) coatings and surface washes have been attempted, but with limited success. In addition, barrier coatings and additions of alumina or silica have been investigated, but have not been entirely successful.

In view of the above, it would be desirable to improve the lumen maintenance characteristics of fluorescent lamps that contain certain phosphors prone to poor lumen maintenance, including but not limited to ZSM, SR, and SB.

BRIEF DESCRIPTION OF THE INVENTION

The present invention provides methods and phosphor-containing coating compositions capable of modifying the lumen maintenance characteristics of phosphor-containing coatings and fluorescent lamps that utilize such coatings.

According to one aspect of the invention, a phosphor-containing coating includes at least a first phosphor that depreciates from exposure to ultraviolet radiation of at least a first wavelength, and further includes an additive composition in a sufficient amount and sufficiently uniformly distributed to attenuate absorption by the first phosphor of the ultraviolet radiation of the first wavelength.

According to another aspect of the invention, a method for improving the lumen maintenance of a fluorescent lamp includes forming a phosphor-containing coating to contain at least a first phosphor that depreciates during operation of the fluorescent lamp, and forming the phosphor-containing coating to further contain an additive composition in a sufficient amount and sufficiently uniformly distributed in the phosphor-containing coating to inhibit depreciation of the first phosphor during operation of the fluorescent lamp.

According to yet another aspect of the invention, a method for improving the lumen maintenance of a fluorescent lamp includes providing a phosphor blend containing a first phosphor that exhibits a poorer lumen maintenance than at least a second phosphor in the phosphor blend, and forming therefrom a phosphor-containing coating of a fluorescent lamp, wherein the phosphor-containing coating contains an additive composition in a sufficient amount and sufficiently uniformly distributed to improve the lumen maintenance of the first phosphor.

A technical effect of the invention is the ability to improve the lumen maintenance exhibited by a phosphor-containing coating of a fluorescent lamp by addressing the rapid depreciation of one or more phosphors in the phosphor-containing coating, and particularly those phosphors that exhibit rapid mercury consumption (binding) or sensitivity to certain UV wavelengths, for example, the 185 nm wavelength emitted by low pressure mercury lamps.

Other aspects and advantages of this invention will be better appreciated from the following detailed description.

BRIEF DESCRIPTION OF THE DRAWINGS

FIG. 1 represents a fluorescent lamp, a fragmentary cross-sectional view of a tube of the lamp, and an inner surface of the tube provided with a coating system that includes a phosphor-containing coating.

DETAILED DESCRIPTION OF THE INVENTION

The invention will be described hereinafter in reference to the lamp 10 shown in FIG. 1, though it should be appreciated that the teachings of the invention are not limited to the lamp 10 and instead are more generally applicable to various applications in which visible light is generated with the use of one or more phosphor compounds. It should also be noted that the drawings are drawn for purposes of clarity when viewed in combination with the following description, and therefore are not necessarily to scale.

The invention relates to coating systems that include a phosphor-containing coating, such as the phosphor-containing coating 22 of FIG. 1, typically applied to a transparent or translucent substrate, such as the glass shell 12 of the fluorescent lamp 10. Though the coating 22 is represented in FIG. 1 as a single layer, and in the case of FIG. 1 may be the only phosphor-containing coating of the lamp 10 such that all phosphors within the coating system of the lamp 10 are within the coating 22, the coating system could comprise any number of phosphor-containing layers and coatings. In addition, any such phosphor-containing layers and/or coatings could contain constituents in addition to phosphors, for example, a scattering agent selected on the basis of its ability to scatter incoming UV radiation prior to being absorbed by the phosphors. Such a scattering agent can be provided within a phosphor-containing layer in lieu of or in addition to the UV-reflecting barrier layer 24 represented in FIG. 1.

In the nonlimiting example of FIG. 1, UV radiation emitted by an ionized constituent (for example, mercury) is absorbed by the phosphor composition within the coating 22, resulting in excitation of phosphor compounds within the phosphor composition to produce visible light that is emitted through the shell 12. In preferred examples in which the ionized constituent is mercury, the emitted UV radiation is predominantly at a wavelength of about 254 nm, with a secondary wavelength of about 185 nm. Consequently, one or more phosphors within the coating 22 are chosen on the basis of their ability to predominantly absorb and be excited by the predominant 254 nm wavelength of UV radiation, and then emit wavelengths of visible light that will provide a desired lighting effect. Notable but nonlimiting examples of such phosphors include ZSM ($Zn_2SiO_4:Mn^{2+}$), SR ($Sr_3(PO_4)_2:Sn^{2+}$), SB ($Sr_5(PO_4)_3(F,Cl):Sb^{3+},Mn^{2+}$), CBM ($GdMgB_5O_{10}:Ce^{3+},Mn^{2+}$), SAE ($Sr_4Al_{14}O_{25}:Eu^{2+}$), and halophosphors (e.g., $Ca_5F(PO_4)_3$:Sb and/or $Ca_5(PO_4)_3(F,Cl)$: $Sb^{3+},Mn^{2+}$). Though these and other phosphors absorb and are predominantly excited by the 254 nm wavelength of UV radiation to produce visible light, these phosphors may also absorb the 185 nm wavelength of UV radiation without generating a significant level of visible light therefrom. In addition, certain phosphors may even be damaged by the absorption of the 185 nm wavelength, notable but nonlimiting examples of which include zinc silicate phosphors such as ZSM and strontium-based phosphors such as SR and SB, and typically to a lesser extent halophosphors. The performances of the SR and SB phosphors and halophosphors are also known to be reduced by rapid mercury consumption (binding). Such damage can lead to depreciation of such phosphors with aging, characterized by lumen loss, color instability and/or color shift of the phosphor, and leads to poor lumen maintenance of the lamp 10, evident from decreasing light brightness of the lamp 10.

In view of the above, a particular aspect of the invention is to formulate the phosphor-containing coating 22 to contain at least one additive composition that is capable of reducing the rate and/or extent at which a phosphor depreciates within the coating 22, especially but not solely due to mercury binding and/or damage from one or more UV wavelengths, without attenuating a wavelength required to excite the phosphor for the purpose of emitting visible light. Notable examples are the 185 nm and 254 nm wavelengths of low pressure mercury lamps, the former wavelength which may damage SR, SB, ZSM, and halophosphors, and the latter wavelength being required by these same phosphors to produce visible light. Particularly preferred additive compositions are believed to be capable of selectively attenuating the 185 nm wavelength emitted by low pressure mercury lamps to reduce the damaging effect of this wavelength on various phosphors, including SR, SB, and ZSM, while not attenuating the 254 nm wavelength. While not wishing to be held to any particular theories, by attenuating 185 nm radiation the additive compositions are believed to be able to reduce undesirable mercury binding reactions induced by 185 nm radiation, for example, mercury binding reactions enabled as a result of $H_2O$ and OH breakdown caused by 185 nm radiation. Other potential benefits include improved lamp performance, improved lumen maintenance, and reduced color shift, enabling the use of such phosphors in a wider range of applications. As nonlimiting examples, ZSM, often recognized as a high color rendition phosphor, may be used in phosphor blends comprising CBM, SAE, and/or halophosphors in high CRI (approaching 100) lamps formulated for color temperatures ranging from 2700K to 3500K, and phosphor blends containing ZSM, SR and SB may be used in high CRI lamps formulated for color temperatures of about 4100K and higher. Particular types of lamps that may be capable of using either or both of the above-noted formulations of the coating 22 include CFL, T5, T5HO, T8, T12, BIAX, Chroma 50, Chroma 75, and specialty lamps, for example, lamps used for stage and studio lighting applications where both high CRI and maximum light levels are desired.

Yttria (yttrium oxide; $Y_2O_3$) is a particularly notable candidate for the one or more additive compositions that can be used in the coating 22 to attenuate the 185 nm wavelength without absorbing the 254 nm wavelength. Another notable candidate having these capabilities is lanthana (lanthanum oxide; $La_2O_3$). Other additive compositions potentially exist and can be used alone or in combination with yttria and/or lanthana if able to attenuate the 185 nm wavelength without absorbing the 254 nm wavelength (or another wavelength) required by phosphors in the coating 22 to produce visible light. More broadly, additive compositions should be capable of selectively attenuating a wavelength that would damage one or more phosphors in the coating 22 without attenuating one or more wavelengths required to excite the phosphors. To be effective, it is further believed that the additive composition(s) should be of high purity (e.g., purity levels of 99.999% weight percent or more) and uniformly distributed throughout the coating 22 to provide a uniform coating over and surrounding those phosphor particles within the coating 22 that are particularly susceptible to depreciation, e.g., particles of ZSM, SR and/or SB within the coating 22. For use in coatings 22 containing ZSM in combination with CBM, SAE, and/or halophosphors, a suitable content for yttria as the additive composition is believed to be in a range of about 2 to about 4 weight percent of the phosphor blend with the coating 22 to promote the likelihood that the ZSM particles will be surrounded by yttria. For use in coatings 22 containing ZSM in combination with SB and/or SR, a suitable content for yttria as the additive composition is believed to be in a range of about 1 to about 3 weight percent of the phosphor blend with the coating 22 to promote the likelihood that the ZSM, SB and/or SR particles will be surrounded by yttria. In both examples, yttria amounts of as low as about 0.1 weight percent of the phosphor blend and as high as about 10 weight percent of the phosphor blend could possibly be used. Similar or identical amounts are believed to be appropriate if lanthana is used alone or in combination with yttria and/or other candidates for the additive composition. Such resulting compositions for the coating 22 may have various desirable attributes, for example, excellent color rendering, improved light output maintenance, color stability and/or initial light levels, and reduced mercury loss.

To provide a high purity and uniformly distributed additive composition throughout the coating 22, the additive composition can be incorporated as a precursor (e.g., salt) into the phosphor blend of the coating 22. The precursor can be present in a liquid vehicle that, when combined with the phosphor blend and then dried, will yield a coating layer ready for lehring or some other process capable of producing the coating 22. The liquid vehicle may comprise one or more non-ionic thickening agents and/or surfactants to promote the formation of a uniform coating of the additive composition over the phosphor particles being combined therewith to form the coating 22. Particularly suitable thickening agents and surfactants for use in this process will depend on the nature of the additive composition(s) and phosphor(s) being combined to form the coating 22, as well as the type of lamp. As such, examples of potentially suitable thickening agents include but are not limited to polyethers such as polyethylene oxide and cellulose types such as hydroxyethylcellulose, and examples of potentially suitable surfactants include but are not limited to nonionic types such as NPE (nonylphenolethoxylate) and block copolymers of ethylene oxide and propylene oxide. Other potentially suitable thickening agents and surfactants, as well as other potential constituents for the vehicle containing the additive composition, may be known to those skilled in the art, and such constituents can be employed if they do not precipitate or interact with the additive composition in any manner that would adversely inhibit or prevent the uniform dispersion of the additive composition in the coating 22 or adversely inhibit or prevent the ability of the additive composition to uniformly coat the phosphor particles.

In combination with the surfactant(s) and thickening agent(s), the additive composition can be present in the form of dissolved ions in the liquid vehicle during incorporation of the additive composition into a mixture of phosphor particles of the one or more phosphors desired for the coating 22. A particular but nonlimiting example involves carefully selecting one or more soluble salts that are capable of being converted to the desired additive composition, for example during a lehring operation performed on the lamp 10, and then combining the one or more soluble salts with a suitable solvent and one or more suitable thickening agents and surfactants to form a liquid vehicle capable of being mixed with a suspension containing particles of the desired phosphor(s) for the coating 22. Nonlimiting examples of suitable salts capable of being converted into yttria are yttrium acetate, yttrium chloride, and yttrium nitrate, and nonlimiting examples of suitable salts capable of being converted into lanthana are lanthanum acetate, lanthanum chloride, and lanthanum nitrate. These salts are capable of being dissolved in water and converted into yttria or lanthana at temperatures that are compatible with lehring and other processing of shells (glass envelopes) performed during the manufacture of fluorescent lamps.

Various formulations can be utilized as the suspension that contains the phosphor particles and is combined with the liquid vehicle containing the additive composition. As an example, such suspensions will often comprise one or more surfactants, thickening agents, dispersants, etc., creating a liquid vehicle in which the phosphor particles are suspended. Suitable particle sizes for the phosphor particles are generally on the order of about 2 to about 20 micrometers, and in any event are preferably of sufficiently small size to enable the salts of the additive composition to become uniformly distributed throughout the suspension, and thereafter, after conversion of the salts to form the additive composition, enable the additive composition to provide a uniform coating over and surrounding the individual phosphor particles within the coating 22.

While the invention has been described in terms of specific embodiments it is apparent that other forms could be adopted by one skilled in the art. Therefore, the scope of the invention is to be limited only by the following claims.

The invention claimed is:

1. A method for improving the lumen maintenance of a fluorescent lamp, the method comprising:
   providing a phosphor blend containing a first phosphor that exhibits a poorer lumen maintenance than at least a second phosphor in the phosphor blend; and
   forming with the phosphor blend a phosphor-containing coating of a fluorescent lamp, wherein the phosphor-containing coating contains an additive composition in a sufficient amount and sufficiently uniformly distributed to improve the lumen maintenance of the first phosphor;
   wherein the forming step comprises:
   combining the phosphor blend with a liquid vehicle that contains at least one soluble salt of the additive composition; and
   converting the soluble salt to the additive composition.

2. The method of claim 1, wherein the additive composition is yttria and/or lanthana.

3. The method of claim 1, wherein the forming step causes the additive composition to define a uniform coating over and surrounding individual particles of the first phosphor.

4. A method for improving the lumen maintenance of a fluorescent lamp, the method comprising:
   forming a phosphor-containing coating to contain at least a first phosphor that depreciates during operation of the fluorescent lamp; and
   forming the phosphor-containing coating to further contain an additive composition in a sufficient amount and sufficiently uniformly distributed in the phosphor-containing coating to inhibit depreciation of the first phosphor during operation of the fluorescent lamp;
   wherein the step of forming the phosphor-containing coating to further contain an additive composition comprises:
   combining a phosphor blend with a liquid vehicle that contains at least one soluble salt of the additive composition; and
   converting the soluble salt to the additive composition.

5. The method of claim 4, wherein the additive composition is yttria and/or lanthana.

\* \* \* \* \*